(12) United States Patent
Bobay et al.

(10) Patent No.: US 6,354,162 B1
(45) Date of Patent: Mar. 12, 2002

(54) SENSOR MOUNTING ASSEMBLY AND METHOD

(75) Inventors: Dennis P. Bobay, Ossian; Harold B. Harms, Fort Wayne; Peter B. Lytle, Fort Wayne; Glen C. Young, Fort Wayne, all of IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,739

(22) Filed: May 30, 2001

(51) Int. Cl.[7] .............................................. G01D 21/00
(52) U.S. Cl. .................................... 73/866.5; 310/68 B
(58) Field of Search ......................... 73/866.5, 514.39; 310/68 B

(56) References Cited

U.S. PATENT DOCUMENTS

| | | | | |
|---|---|---|---|---|
| 5,293,125 A | * | 3/1994 | Griffen et al. ............... | 324/173 |
| 5,325,005 A | * | 6/1994 | Denk ........................ | 310/68 B |
| 5,408,894 A | * | 4/1995 | Henson ...................... | 73/866.5 |
| 5,563,357 A | * | 10/1996 | Longree ..................... | 73/866.5 |
| 5,635,780 A | * | 6/1997 | Kohlert et al. ............. | 310/68 R |
| 5,879,785 A | * | 3/1999 | Shin .......................... | 428/209 |
| 5,895,994 A | | 4/1999 | Molnar et al. | |
| 5,998,892 A | * | 12/1999 | Smith et al. ............... | 310/68 B |
| 6,062,085 A | * | 5/2000 | Song ........................ | 73/649 |
| 6,084,328 A | * | 7/2000 | Yamashita et al. ........... | 310/90 |
| 6,118,198 A | | 9/2000 | Hollenbeck et al. | |
| 6,133,666 A | | 10/2000 | Hollenbeck et al. | |
| 6,170,345 B1 | * | 1/2001 | Kerner ....................... | 73/866.5 |
| 6,225,716 B1 | * | 5/2001 | Sies et al. ................. | 310/68 B |
| 6,232,687 B1 | | 5/2001 | Hollenbeck et al. | |
| 6,239,532 B1 | * | 5/2001 | Hollenbeck et al. ........ | 310/257 |
| 6,295,881 B1 | * | 10/2001 | Stewart et al. ............. | 73/866.5 |

* cited by examiner

*Primary Examiner*—Hezron Williams
*Assistant Examiner*—Charles D Garber
(74) *Attorney, Agent, or Firm*—Damian Wasserbauer, Esq.; Armstrong Teasdale LLP

(57) ABSTRACT

A rotor position sensor mounting assembly includes a housing, a hall effect device, a printed circuit board, a plurality of leads, and a cable tie. The housing includes two pairs of guides that fixedly attach the housing to a stator end cap and a plurality of stator laminations. The second pair of housing guides extend substantially flush with the top wall. A gap extends between the first pair of housing guides and the second pair of housing guides and the first pair of housing guides has a wedge shape. In addition, a pair of internal guides extend from the second side walls into the cavity such that the internal guides form the cavity into a substantially inverted T at a first end of the housing to precisely locate the hall effect device.

28 Claims, 6 Drawing Sheets

SENSOR MOUNTING ASSEMBLY AND METHOD

BACKGROUND OF INVENTION

This invention relates generally to electric motors, and more particularly to rotor position sensing assemblies within electric motors.

Some electric motors require a rotor position-sensing device for proper operation. The rotor position sensing devices provide information to a motor controller. In order to provide reliable information, the sensors need to be positioned very accurately, otherwise the motor may fail to run or may run inefficiently.

Hall effect devices are ubiquitous in automotive, aircraft, appliance and tool applications where non-contact sensing is required. Hall effect devices are sensors that detect motion, position or change in field strength of an electromagnet, a permanent magnet, or a ferromagnetic material with an applied magnetic bias. Electric motors typically use electromagnetic fields to create torque or force. It is known to use hall effect devices in electric motors to sense a position of a rotor magnet. The hall effect device must be accurately positioned relative to the midpoint of the rotor magnet. Displaced hall effect devices can produce hysteresis and motor current discontinuities that disturb torque.

It would be desirable to provide a method and system for mounting a rotor position sensor that reliably and accurately mounts a sensor within an electric motor rotor at a low cost.

SUMMARY OF INVENTION

In an exemplary embodiment of the invention, a rotor position sensor assembly includes a housing, a hall effect device, a printed circuit board, a plurality of leads, and a cable tie. The housing includes two pairs of guides that fixedly attach the housing to a stator end cap and a plurality of stator laminations.

More particularly, the housing includes a bottom wall, a pair of first side walls extending from the bottom wall, a first pair of housing guides extending from the first sides walls, a top wall, a pair of second side walls connecting the first side walls with the top wall, and a second pair of housing guides extending from the second side walls. The first side walls extend substantially perpendicularly to the bottom wall and the top wall extends substantially parallel to bottom wall. The second pair of housing guides is substantially flush with the top wall.

A gap extends between the first pair of housing guides and the second pair of housing guides. The first pair of housing guides has a wedge shape. A step extends from the bottom wall into a housing cavity. In addition, a pair of internal guides extend from the second side walls into the cavity such that the internal guides form the cavity into a substantially inverted T at a first end of the housing.

The housing is formed of a resilient material and attaches to a stator end cap with a snap-fit relationship. The housing attaches to the stator end cap quickly and easily and provides a secure fit between the stator end cap and the sensor housing.

DETAILED DESCRIPTION

Figure 1:
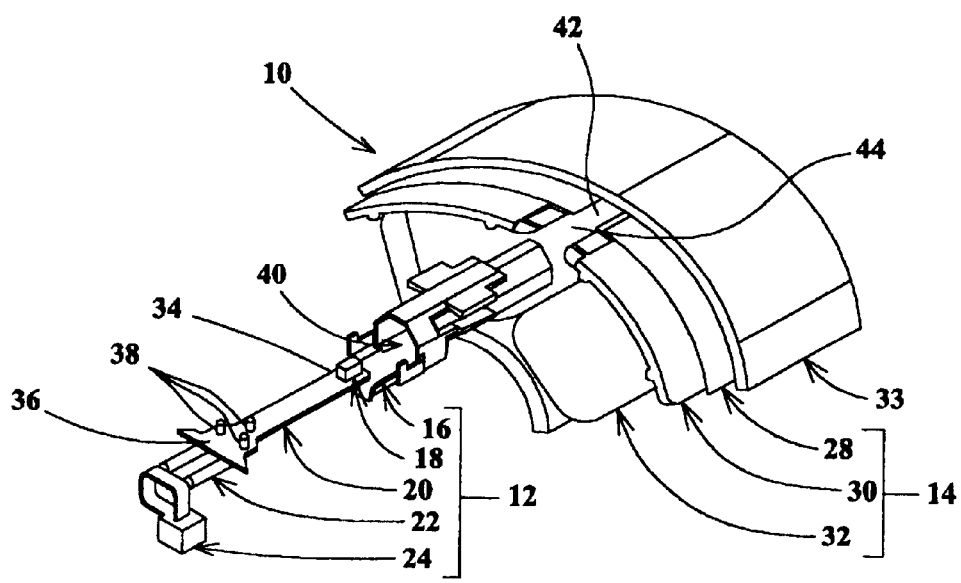
FIG. 1 is an exploded partial cut-away view of a motor assembly including a hall effect assembly and a stator assembly.

FIG. 1 is an exploded partial cut-away view of a motor assembly 10 including a hall effect assembly 12 and a stator assembly 14. In one embodiment, the motor is an 84 MM electronically commutated motor commercially available from the General Electric Company, Schenectady, N.Y. Hall effect assembly 12 includes a hall effect housing 16, a hall effect device 18, a printed circuit board (PCB) 20, a plurality of sensing leads 22, and a cable tie 24. Stator assembly 14 includes a plurality of stator laminations 28, a first stator end cap 30, a second stator end cap (not shown), and a plurality of stator windings 32. Motor assembly 10 also includes a rotor magnet 33, attached to a rotor assembly (not shown). In one embodiment, stator laminations are fabricated from steel and first stator end cap 30 and the second stator end cap are fabricated from molded plastic.

Hall effect device 18 is mounted to a first end 34 of PCB 20 and is electrically connected thereto. Sensing leads 22 are mounted to a second end 36 of PCB 20 which includes a plurality of openings 38. The number of openings equals the number of sensing leads 22 and one sensing lead 22 is positioned within a respective opening. In one embodiment, sensing leads 22 are positioned through openings 38 and are soldered to PCB 20. Cable tie 24 is connected to sensing leads 22. In one embodiment, cable tie 24 attaches sensing leads 22 to hall effect housing 16 and maintains sensing leads 22 in a fixed relationship thereto.

PCB 20 is positioned at least partially within hall effect housing 16 such that hall effect device 18 is within a cavity 40 of hall effect housing 16. Stator laminations 28 include a plurality of gaps 42 (only one gap is shown in FIG. 1) extending a length of stator laminations 28 and first stator end cap 30 includes a plurality of gaps 44 (only one gap is shown in FIG. 1). Gaps 42 are aligned with gaps 44. Hall effect housing 16 fits within gap 44 and engages first stator end cap 30 and fits within gap 42 and engages stator laminations 28 to securely and accurately position hall effect device 1 8 with respect to rotor magnet 26. In one embodiment, hall effect housing 1 6 engages first stator end cap 30 with a snap-fit relationship to tangentially and radially position hall effect device 18.

Hall effect assembly 12 includes an insulating encapsulation compound that is well known in the art and which is poured into cavity 40 to encapsulate the electrical connection of sensing leads 22 to PCB 20 at openings 38 and protect the connections from moisture. In addition, the electrical connections are insulated to provide adequate creepage and clearance distances to stator laminations 28, stator windings 32, and a metal center post (not shown in FIG. 1) that supports stator assembly 14.

Figure 2:
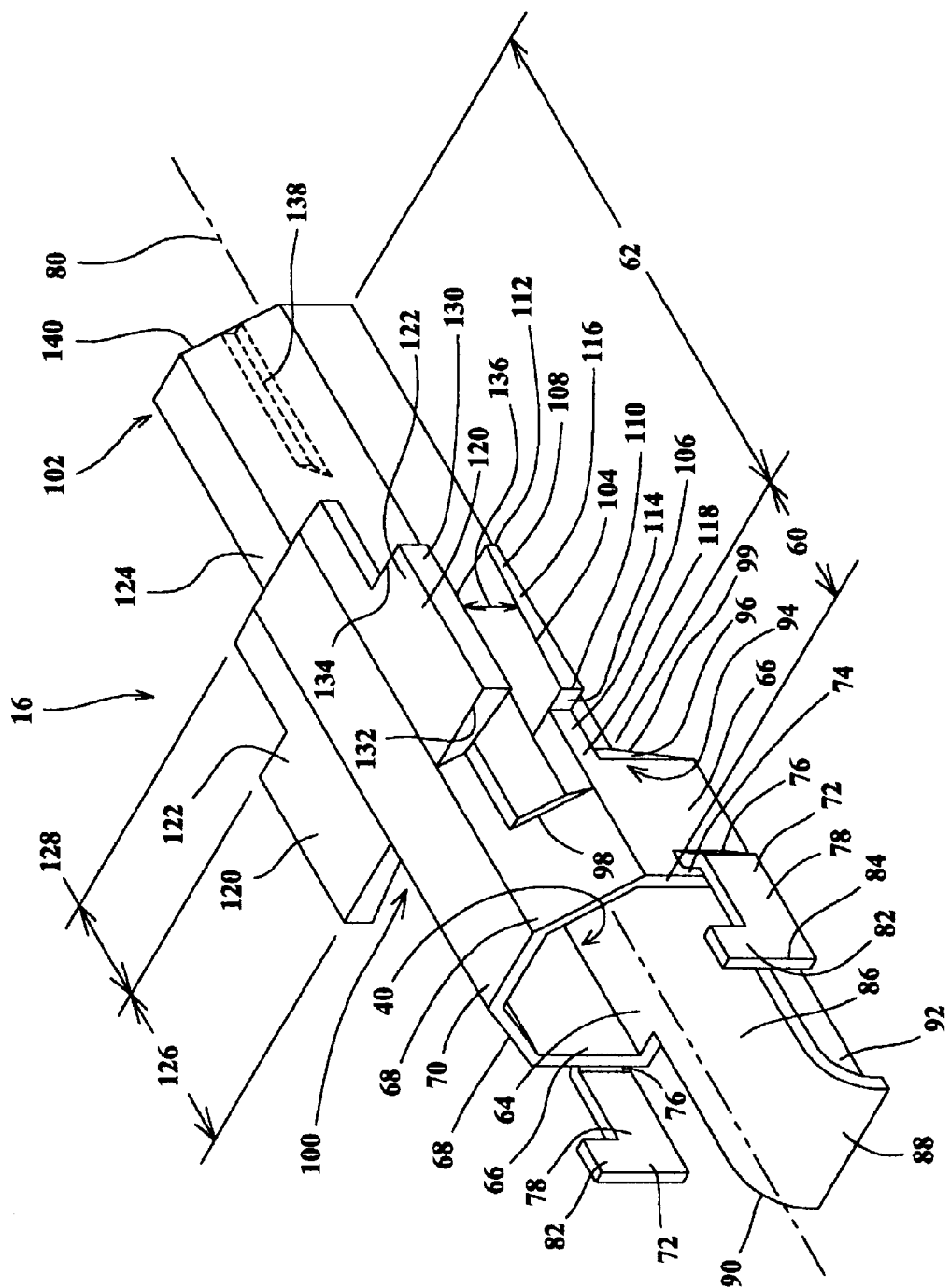
FIG. 2 is a perspective view of a hall effect housing shown in FIG. 1.

FIG. 2 is a perspective view of hall effect housing 16 including a first portion 60 and a second portion 62. First portion 60 and second portion 62 each include a bottom wall 64, a pair of first side walls 66 extending perpendicularly from bottom wall 64, a pair of second, angled side walls 68 extending at an angle from side walls 66, and a top wall 70 connecting angled side walls 68 and extending parallel to bottom wall 64. In one embodiment, housing 16 is fabricated from molded plastic.

Housing first portion 60 includes a pair of arms 72 extending from side walls 66 at a first end section 74 thereof. Arms 72 include an angled extension portion 76 that extends at an angle from side walls 66 and a middle portion 78 that extends parallel to side walls 66 and to a longitudinal axis 80 of housing 16. Arms 72 also include a raised portion 82 that extends from a first end 84 of middle portion 78 perpendicularly to longitudinal axis 80. Middle portion 78 and raised portion 82 form an L shape for arms 72.

Housing first portion 60 also includes a ledge 86 extending from bottom wall 64 at first end section 74. Ledge 86 extends beyond middle portion first end 84 and includes a curved lip 88 at a first end 90 thereof to provide for a flexible strain relief for sensing leads 22 (shown in FIG. 1) when PCB 20 (shown in FIG. 1) is inserted within housing cavity 40. Ledge 86 also includes a plurality of support ribs 92 (only one support rib is shown in FIG. 2) that provide support for ledge 86.

Housing first portion 60 includes a second end section 94 at which side walls 66 and angled side walls 68 transition to walls 66 and 68 having a reduced height in housing second portion 62 with respect to a height of walls 66 and 68 in housing first portion 60. Walls 66 include a stepped transition portion 96 at second end section 94 and walls 68 include a stepped transition portion 98 at second end section 94. Bottom wall 64 includes a step 99 that corresponds to stepped transition portion 96 of side walls 66.

Housing second portion 62 includes a first section 100 and a second section 102. First section 100 includes a first housing guide 104 extending from each side wall 66. First housing guide 104 includes a first section 106 and a second section 108. First section 106 extends from housing first portion 60 and is substantially planar therewith. First housing guide second section 108 extends longitudinally from first section 106 and beyond first section 106 away from longitudinal axis 80. First housing guide second section 108 includes a first end 110 adjacent first section 106 and having a first height and a second end 112 having a second height. In one embodiment, second height 112 is less than first height 110. In an alternative embodiment, second height 112 is the same as first height 110. A step 114 extends between a side surface 116 of second section 108 and a side surface 118 of first section 106.

Housing second portion first section 100 also includes a second housing guide 120 extending from each angled side wall 68 and having a top surface 122 coplanar with a top surface 124 of top wall 70 at housing first portion 60 and housing second portion 62. In an alternative embodiment, top surface 122 is coplanar with top surface 124 of top wall 70 at housing first portion 60 and is not coplanar with top surface 124 of top wall 70 at housing second portion 62. Second housing guides 120 have a first portion 126 and a second portion 128. Second housing guide first portion 126 extends a greater distance from angled side wall 68 than second housing guides second portion 128.

Second housing guides second portion 128 has a substantially uniform thickness and second housing guide first portion 126 has a first thickness adjacent angled side wall 68 and a second greater thickness at an outer edge 130. The second housing guide first portion thickness is the same as the second housing guide second portion first thickness. In one embodiment, the first portion thickness at outer edge 130 is greater at a first end 132 of second housing guide 120 than at a second end 134 of second housing guide 120. In an alternative embodiment, the first portion thickness at outer edge 130 is substantially uniform from first end 132 to second end 134. A gap 136 extends between first housing guide 104 and second housing guide 120 on each side of housing 16.

Housing second portion second section 102 includes a pair of internal guides 138 (only one is shown in FIG. 2) that extend from a first end 140 of housing 16 towards housing first portion 60. The guides extend within housing cavity 40 from an inner wall (not shown) of housing second angled side walls 68.

Figure 3:
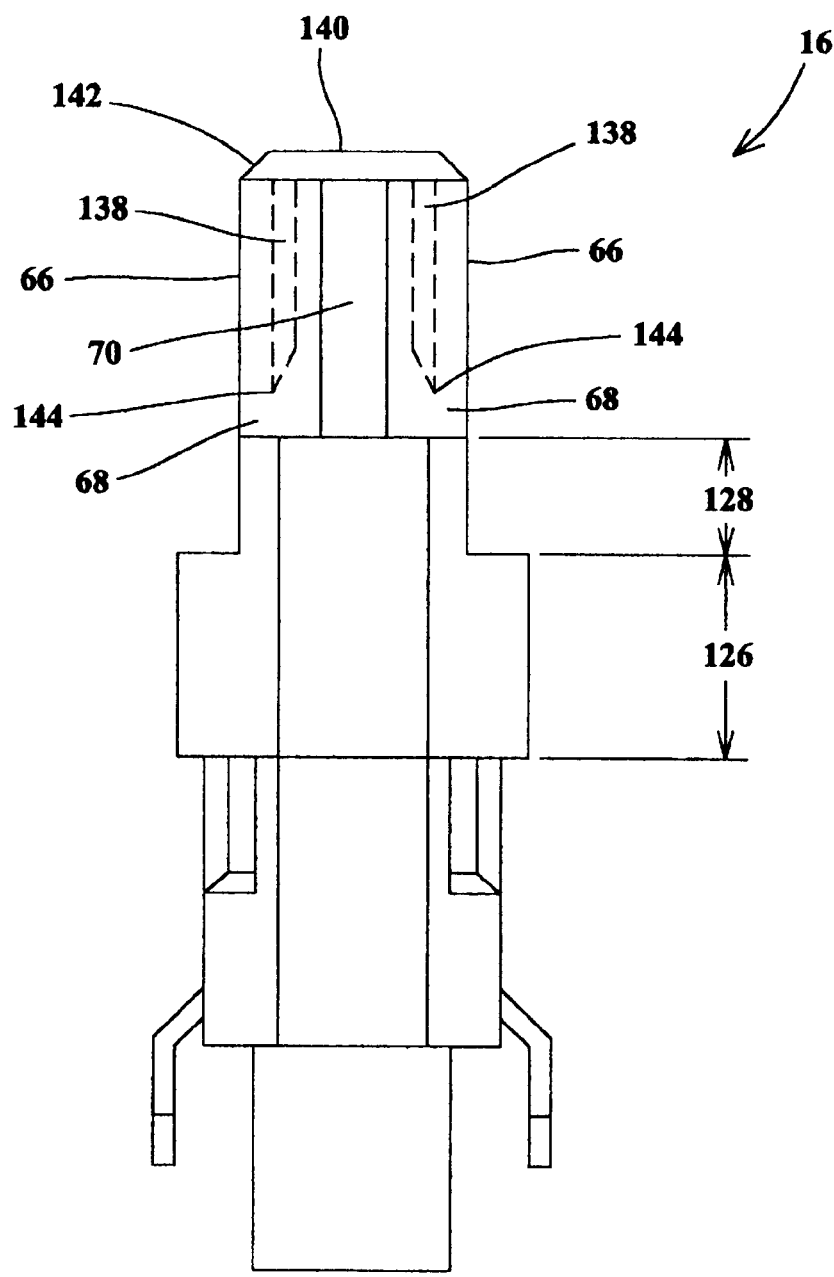
FIG. 3 is a top view of the hall effect housing shown in FIG. 1.

FIG. 3 is a top view of housing 16 including guides 138 extending from end 140. End 140 is beveled at top wall 70, second angled side walls 68, first side walls 66, and bottom wall 64 (shown in FIG. 2) such that an angled connector portion 142 extends between end 140 and top wall 70, second angled side walls 68, first side walls 66, and bottom wall 64. Guides 138 taper towards second angled side wall 68 at an end 144. Second housing guides second portion 128 extends from a top portion of second angled side walls 68 a distance approximately equal to a distance that first side walls 66 extend from top wall 70.

Figure 4:
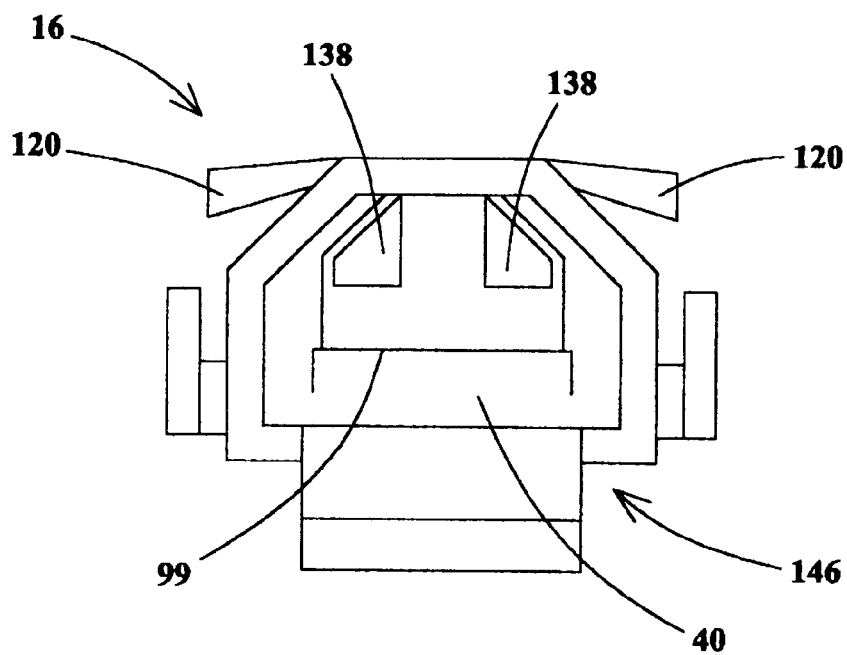
FIG. 4 is an end view of the hall effect housing shown in FIG. 1 including a second end.

FIG. 4 is an end view of housing 16 including a second end 146. Cavity 40 extends into housing 16 at end 146 and step 99 extends from bottom wall 64 into cavity 40. Internal guides 138 extend into a top portion of cavity 40. Second housing guides 120 have a wedge shape to facilitate attaching housing 16 to stator assembly 14 (shown in FIG. 1) as will be described below in greater detail.

Figure 5:
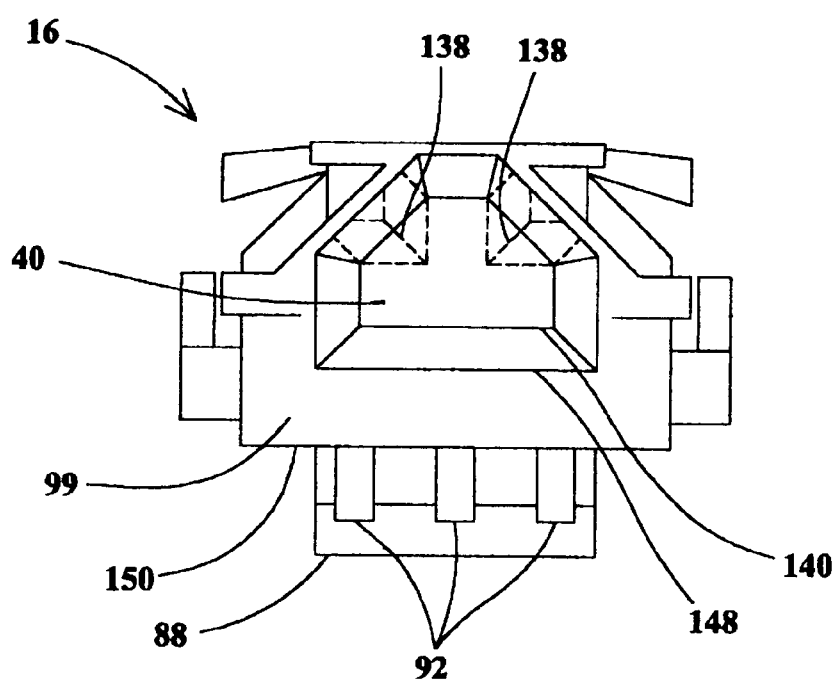
FIG. 5 is an end view of the hall effect housing shown in FIG. 1 including a first end.

FIG. 5 is an end view of housing 16 including first end 140. Internal guides 138 extend into cavity 40 and form cavity 40 into a substantially inverted T shape at end 140. Housing step 99 extends between a first portion 148 of bottom wall 64 and a second portion 150 of bottom wall 64 and is angled therebetween such that step 99 form a ramp between first portion 148 and second portion 150. Housing 16 support ribs 92 extend from bottom wall 64 and connect to lip 88.

Figure 6:
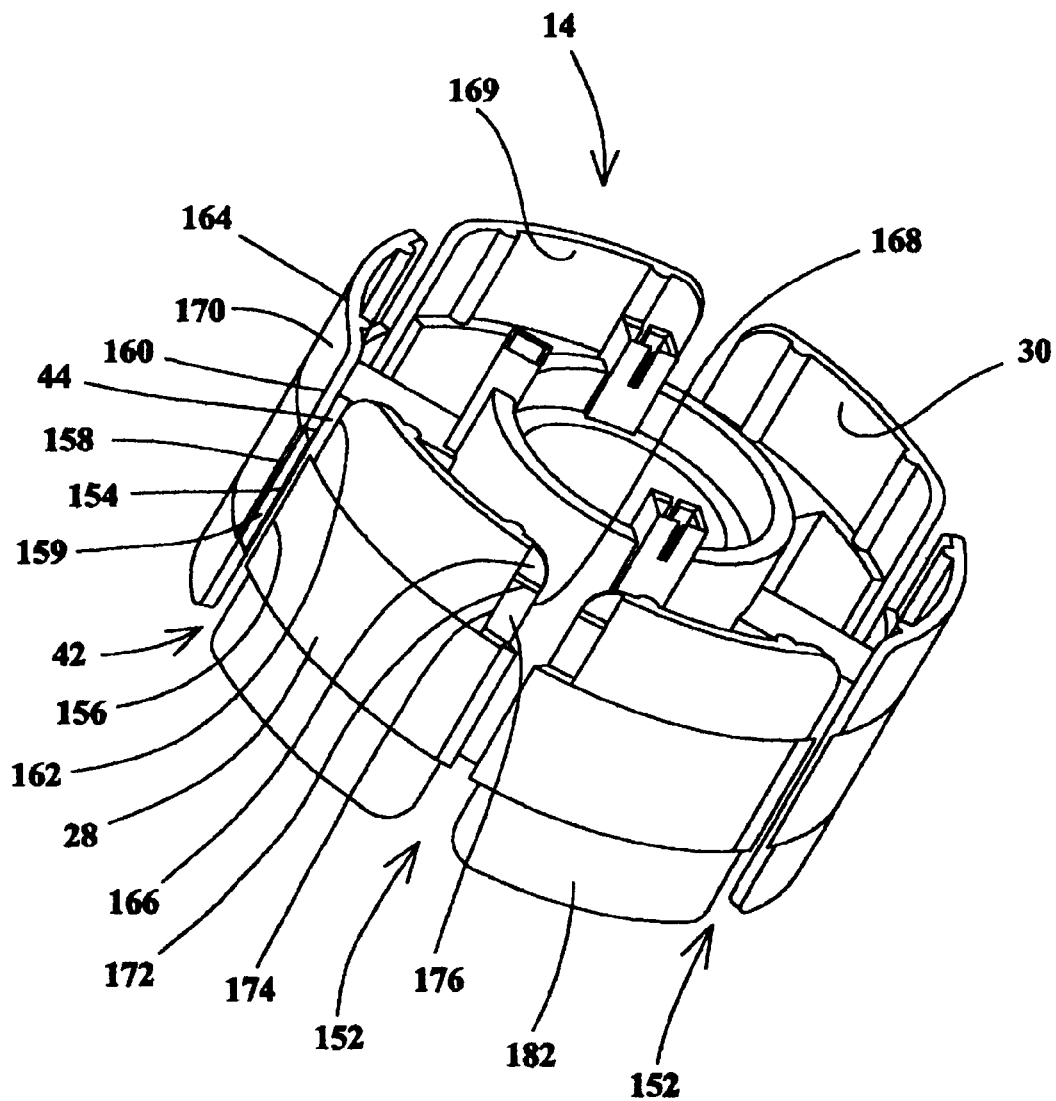
FIG. 6 is a perspective view of the stator assembly shown in FIG. 1.

FIG. 6 is a perspective view of stator assembly 14 illustrating stator lamination gaps 42, first stator end cap gaps 44 and a plurality of second stator end cap gaps 152. Stator lamination gaps 42 are narrower than end cap gaps 44 and 152 which are substantially the same size. Stator lamination gaps 42 are defined by a stator lamination first edge 154 and a stator lamination second edge 156. First edge 154 includes a step 158 that extends a length of stator lamination first edge 154. First edge 154 is at substantially the same radial height as second edge 156. First stator end cap gaps 44 are defined by a first stator end cap first edge 160 and a first stator end cap second edge 162.

First stator end cap 30 includes a first end 164 from which a first notch 166 extends along each of edges 160 and 162 of at least one gap 44. Notches 166 extend from an inner portion 168 of first stator end cap 30 to an outer surface 170 of first stator end cap 30 at a bridge 172. Inner portion 168 is adjacent an inner surface 169 of first stator end cap 30. Notches 166 form a ramp between first end 164 and bridge 172 and flare away from edges 160 and 162 from bridge 172 to first end 164. In one embodiment, notches 166 extend from one edge 160 and one edge 162. In an alternative embodiment, notches 166 extend from more than one edge 160 and more than one edge 162. In a further alternative embodiment, notches 166 are not flared.

Notched edges 160 and 162 also include a step 174 that extends from bridge 172 to a second notch 176. Second notch 176 extends from bridge 172 to stator laminations 28 and flares away from edges 160 and 162 from bridge 172 to stator laminations 28. In addition, notches 176 increase in depth from bridge 172 to stator laminations 28. In an alternative embodiment, notches 176 are not flared and have a substantially uniform depth.

Figure 7:
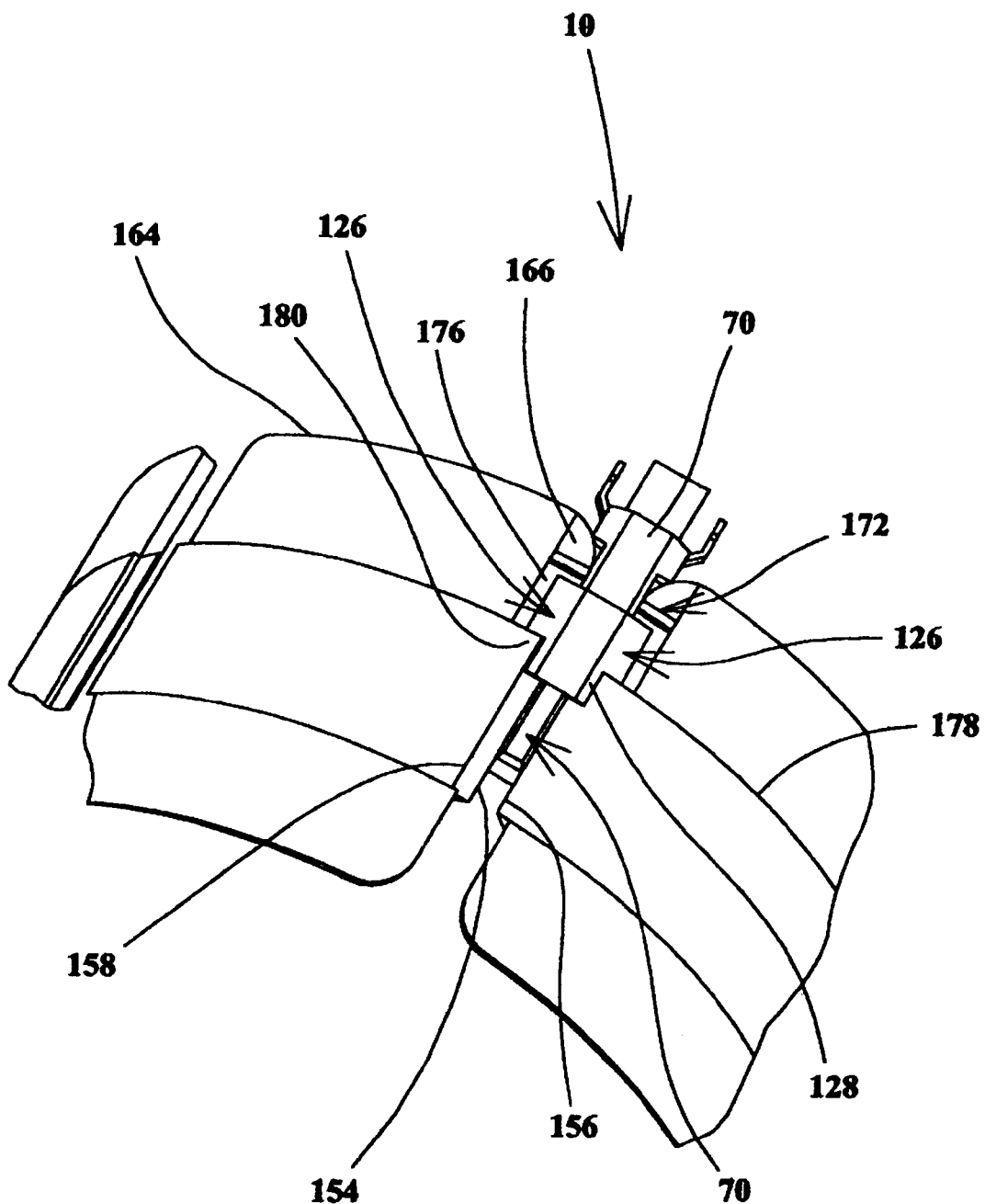
FIG. 7 is an enlarged side view of the motor assembly shown in FIG. 1.

FIG. 7 is an enlarged side view of motor assembly 10 including hall effect housing 16 connected to stator assembly 14 at stator laminations 28 and first stator end cap 30. Second housing guides first portion 126 fits, i.e. nests, within second notches 176 and extends from a first end 178 of stator laminations 28 to bridge 172. Second housing guides second portion 128 fits over stator lamination second edge 156 and stator lamination first edge 154 and abuts first edge step 158. Stator laminations 28 are circumferentially ramped from first edge step 158 to second edge 156. Second housing guides second portion 128 is substantially flush with an upper portion 180 of stator laminations 28 adjacent step 158.

Motor assembly 10 is assembled by positioning first stator end cap 30 adjacent stator laminations 28 and press fitting first stator end cap into stator laminations 28. Second stator end cap 182 is positioned adjacent stator laminations 28 and is press fit onto stator laminations 28. Printed circuit board 20 is positioned within housing 16 such that hall effect device 18 is maintained in a fixed relation with respect to housing 16. Step 99 guides hall effect device 18 to a proper height and internal guides 138 guide hall effect device 18 to, and maintain hall effect device 18 in, the proper position with respect to housing first side walls 66. Housing first end 140 is then positioned within first stator end cap gap 44. Housing 16 is slid along a length of gaps 44 and 42 such that first housing guides 104 contact inner surface 169 and second housing guides 120 contact notches 166. Housing 16 is slid further into gaps 44 and 42 such that second housing guides 120 contact bridge 172 and slide over bridge 172. Housing 16 is inserted further within gaps 44 and 42 such that second housing guides first portion 126 nests within second notches 176 and second housing guides second portion 128 lies adjacent an outer surface of stator laminations 28.

Housing 16 is fabricated from a flexible material such that second housing guides 120 spring back into a relaxed position once guides enter notches 176. Due to the wedge shape of guides 120 and 104, housing 16 easily attaches to first stator end cap 30 and stator laminations 28 in a frictional snap-fit relationship that maintain housing 16 and hall effect device 18 accurately positioned with respect to stator assembly 14. In one embodiment, housing 16 is fabricated from injection molded plastic.

While the invention has been described in terms of various specific embodiments, those skilled in the art will recognize that the invention can be practiced with modification within the spirit and scope of the claims.

What is claimed is:

1. A method of positioning a sensor within an electric motor including a rotor assembly, a stator assembly including a stator end cap, and a sensor assembly including a housing, a sensor mounted on a printed circuit board, and a plurality of guides, said method comprising the steps of:

positioning at least a portion of the printed circuit board within the sensor housing such that the sensor is located within a housing cavity adjacent a first end of the housing; and attaching the sensor housing to the stator end cap.

2. A method in accordance with claim 1 wherein said step of attaching the sensor housing to the stator end cap comprises the steps of:

positioning a first pair of housing guides in contact with a first side of the stator end cap; and positioning a second pair of housing guides in contact with a second side of the stator end cap.

3. A method in accordance with claim 1 wherein the housing includes a cavity and a ramped step extending into the cavity, said step of positioning at least a portion of the printed circuit board within the sensor housing comprises the step of sliding the printed circuit board within the housing cavity and along the ramped step to properly position sensor within the housing.

4. A method in accordance with claim 1 wherein the stator assembly further includes a plurality of stator laminations, said method further comprising the step of attaching the sensor housing to the stator laminations.

5. A method in accordance with claim 1 wherein said step of attaching the sensor housing to the stator laminations comprises the step of positioning a first pair of housing guides in contact with a first side of the stator laminations.

6. A method in accordance with claim 2 wherein the housing is fabricated from a resilient blown plastic, the housing configured to attach to the stator end cap in a snap-fit relationship that maintains the housing in a fixed relationship with the stator end cap.

7. A method in accordance with claim 2 wherein the stator end cap includes at least one notch, said step of positioning a second pair of housing guides in contact with a second side of the stator end cap comprises the step of positioning at least one guide of the second pair of guides within the at least one stator end cap notch.

8. A sensor housing for a rotor position sensor, said housing comprising:

a bottom wall;

a pair of first side walls extending from said bottom wall;

a first pair of housing guides extending from said first sides walls;

a top wall;

a pair of second side walls connecting first side walls with said top wall; and a second pair of housing guides extending from said second side walls.

9. A sensor housing in accordance with claim 8 wherein said first side walls extend substantially perpendicularly to said bottom.

10. A sensor housing in accordance with claim 8 wherein said top wall is substantially parallel to said bottom wall.

11. A sensor housing in accordance with claim 8 wherein said second pair of housing guides is substantially flush with said top wall.

12. A sensor housing in accordance with claim 8 wherein said first pair of housing guides has a wedge shape.

13. A sensor housing in accordance with claim 8 wherein a gap extends between said first pair of housing guides and said second pair of housing guides.

14. A sensor housing in accordance with claim 8 wherein said bottom wall, said first side walls, said second side walls, and said top wall form a cavity, said housing further comprising a step extending into the cavity from the bottom wall.

15. A sensor housing in accordance with claim 8 wherein said housing further comprising a pair of internal guides extending from said second side walls into the cavity.

16. A sensor housing in accordance with claim 15 wherein said internal guides form the cavity into a substantially inverted T at a first end thereof.

17. A sensor housing in accordance with claim 8 wherein said second housing guides comprise a first portion and a second portion, said first portion extending from said second side wall further than said second portion.

18. A sensor assembly for an electric motor, said assembly comprising:
- a printed circuit board;
- a sensor attached to the printed circuit board;
- a plurality of sensing leads attached to said printed circuit board; and
- a housing comprising a bottom wall, a pair of first side walls extending from said bottom wall, a first pair of housing guides extending from said first side walls, a top wall, and a second pair of side walls connecting said first side walls with said top wall, said walls forming a cavity, said printed circuit board positioned at least partially within the cavity.

19. A sensor assembly in accordance with claim 18 further comprising a second pair of housing guides extending from said second side walls.

20. A sensor assembly in accordance with claim 18 wherein said first side walls extend substantially perpendicularly to said bottom.

21. A sensor assembly in accordance with claim 18 wherein said top wall is substantially parallel to said bottom wall.

22. A sensor assembly in accordance with claim 18 wherein said second pair of housing guides is substantially flush with said top wall.

23. A sensor assembly in accordance with claim 18 wherein said first pair of housing guides has a wedge shape.

24. A sensor assembly in accordance with claim 18 wherein a gap extends between said first pair of housing guides and said second pair of housing guides.

25. A sensor assembly in accordance with claim 18 wherein said bottom wall, said first side walls, said second side walls, and said top wall form a cavity, said housing further comprising a step extending into the cavity from the bottom wall.

26. A sensor assembly in accordance with claim 18 wherein said housing further comprising a pair of internal guides extending from said second side walls into the cavity.

27. A sensor assembly in accordance with claim 26 wherein said internal guides form the cavity into a substantially inverted T at a first end thereof.

28. A sensor assembly in accordance with claim 18 wherein said second housing guides comprise a first portion and a second portion, said first portion extending from said second side wall further than said second portion.

* * * * *